Patented Nov. 23, 1943

2,335,029

UNITED STATES PATENT OFFICE 2,335,029

REFINING OF MINERAL OILS

Raphael Rosen, Elizabeth, N. J., assignor to Standard Oil Development Company, a corporation of Delaware No Drawing. Application December 7, 1940, Serial No. 369,119

14 Claims. (Cl. 196—18)

The present invention relates to the refining of mineral oils. The invention is more particularly concerned with an improved method for separating waxy constituents from wax-bearing oils in order to produce dewaxed oils having low cold tests, and is especially directed to the utilization of an improved dewaxing solvent selected from the class of cyclic diethers.

It is well-known in the art to separate waxy constituents from wax-bearing mineral oils by various methods, all of which have in common the feature of solidifying the waxy constituents by cooling or chilling the wax-containing feed oils to relatively low temperatures. The separation of the solid precipitated waxy constituents from the chilled oil is then effected by allowing the precipitated waxy constituent to settle by gravity and decanting the wax-free oil, or by filtering the chilled oil in the usual plate and frame presses, in drum filters, or by means of centrifugal or equivalent filters. It is also known in the art to facilitate and accelerate the separation of the waxy constituents from the wax-bearing oil by utilizing various materials as dewaxing solvents and so-called settling or filtering aids. Dewaxing solvents conventionally used are selected from a wide variety of substances. For example, it is known to use various quantities of light naphthas, propane, hexane, pentane, and the like, as well as various acetates, ketones, and alcohols. An ideal solvent in a dewaxing operation is one which has substantially no solubility for the waxy constituents at dewaxing temperature, and which has a very low miscibility temperature with the wax-free oil. It is also desirable that the solvent permit relatively high filtering rates at low temperature in order to secure an economical commercial operation with respect to the capacity of the filtration equipment. A suitable solvent, furthermore, must be a substance which is readily separable and recoverable from the dewaxed oil. Very few solvents or solvent mixtures possess all these characteristics to the desired degree.

I have, however, now discovered a class of solvents which when utilized in operations for the removal of waxy constituents from wax-bearing oils produce unexpected, desirable results. My solvents are cyclic diethers, particularly meta-dioxanes. Meta-dioxanes suitable as dewaxing solvents have the following structural formula:

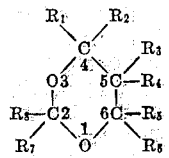

in which $R_1$, $R_2$, $R_3$, $R_4$, $R_5$, $R_6$, $R_7$, and $R_8$ may represent hydrogen or halogen atoms, alkyl, aryl, alkenyl, aralkenyl, alicyclic, aralkyl, or alkaryl radicals, or substituted derivatives thereof, such as the haloalkyl, alkoxy, aryloxy, carboxyl, and hydroxyl radicals. Solvents of this class are, for example, 4-methyl meta-dioxane, 4,4-dimethyl meta-dioxane, 4,5-dimethyl meta-dioxane, 4,4,5-trimethyl meta-dioxane, 2,4,4,6-tetramethyl meta-dioxane, 2,4,4,5,6-pentamethyl meta-dioxane, 2,6-dipropyl-4,4-dimethyl meta-dioxane, 2,6-diphenyl-4,4-dimethyl meta-dioxane, 2,4,4-trimethyl meta-dioxane, 4-ethyl-4-methyl meta-dioxane, 4,4-diethyl meta-dioxane, 4,4-dimethyl-5-tertiary butyl meta-dioxane, 4-tertiary butyl-4-methyl meta-dioxane, 4-phenyl-4-methyl meta-dioxane, 4-methyl-4-amyl meta-dioxane, 4,4-dimethyl-5-chloro meta-dioxane, 4-chloromethyl-4-methyl meta-dioxane, 4-ethyl-5-methoxy meta-dioxane, 4,4-dimethyl-5-phenoxymethyl meta-dioxane, 2,4-dimethyl-5-carboxyethenyl meta-dioxane, 4-methyl-4-hydroxypropyl meta-dioxane, and the like.

One of the major factors influencing the suitability and adaptability of a material for use as a dewaxing solvent is its relative solubility for the waxy constituents and for the oil constituents. As previously stated, the ideal dewaxing solvent is one that will show a relatively low solubility for the waxy constituents, will exhibit a relatively high solubility for the oily fractions, and will also remain completely miscible with the oily constituents at the relatively low temperatures necessarily employed in dewaxing operations. Low wax solubility is desired, since this factor determines the spread between the temperature at which the dewaxing operation is carried out and the pour point of the dewaxed oil. Complete miscibility between the solvent and the oily constituents is necessary in order to secure a satisfactory separation of the wax crystals from the dewaxing solution.

The desirability of using the present class of dewaxing solvents may be seen by reference to the following tables in which the miscibility temperatures and wax solubilities of various substances are listed.

Table 1

| Solvent | Miscibility temp., °F. (three volumes of solvent per one volume of oil) |
|---|---|
| 4,4-dimethyl meta-dioxane | +7 |
| 4,5-dimethyl meta-dioxane | −28 |
| Mixture of 4,4- and 4,5-dimethyl meta-dioxanes | −13 |
| 4,4,5-trimethyl meta-dioxane | −46 |
| 2,4,4,6-tetramethyl meta-dioxane | −59 |
| 2,4,4,5,6-pentamethyl meta-dioxane | −92 |

These diethers may be used singly or in mixtures as dewaxing solvents. They may also be used in combination with other solvents, e. g., benzene, dichloroethyl ether, etc., in suitable proportions to obtain greater selectivity in dewaxing processes.

Table II

| Solvent | Wax solubility, grams of 140°–142° F. M. P. wax per 100 cc. of solvent at— | |
| --- | --- | --- |
| | 40° F. | 80° F. |
| 4,4-dimethyl meta-dioxane | 0.043 | 0.92 |
| 4,4,5-trimethyl meta-dioxane | 0.098 | 1.60 |
| 2,4,4,6-tetramethyl meta-dioxane | 0.165 | 2.90 |
| Mixture of 4,4- and 4,5-dimethyl meta-dioxanes | 0.092 | 1.5 |

From the above it is apparent that substances of the present class are particularly desirable dewaxing solvents and that 4,4-dimethyl meta-dioxane and 4,5-dimethyl meta-dioxane are preferred members of this class. A dewaxing solvent comprising a mixture of these two dioxanes is particularly effective. A solvent of this character has a miscibility temperature between about +7 and −28° F., and a wax solubility at 71° F. between about 0.48 and 0.58 gram of wax per 100 cc. of solvent. Furthermore, these two dioxanes may be readily prepared in such admixture by reacting a refinery C4 cut with formaldehyde in the presence of 25–60% sulfuric acid. The ratio of 4,4- to 4,5-dimethyl meta-dioxane in the final product is readily controlled by controlling the acid concentration and reaction temperature. Since these two compounds boil within one degree centigrade of one another they may easily be removed from the dewaxed oil without having a separation of the solvent occur.

The dewaxing solvents of the present invention may be secured in any desirable manner. They are, however, preferably produced by condensing an olefin with an aldehyde in the presence of a dilute polybasic oxygenated mineral acid. The temperature usually employed is from about 15° to 40° C., and the reactions are carried out in the presence of a polybasic oxygenated mineral acid of from 10% to 85% concentration, such as sulfuric acid. The olefin may be any relatively low boiling olefin, and the aldehyde is preferably formaldehyde, although other aldehydes, such as acetaldehyde, furfuraldehyde, benzaldehyde, mono- or di-chloroacetonyl aldehyde, or aldehyde polymers, such as trioxymethylene and paraldehyde, may be employed.

The following example illustrates the olefin-aldehyde condensation method for preparing meta-dioxanes. 200 cc. of isobutylene were shaken for 8 hours at room temperature in a closed vessel capable of withstanding pressures of several atmospheres with 125 gms. of paraformaldehyde and 25 gms. of 25% sulfuric acid. At the end of the reaction period, the agitation was stopped. On standing, the reaction mixture formed two layers, which were separated by decantation. The desired reaction product in the top layer was isolated by distillation, and consisted of 141 gms. of 4,4-dimethylmeta-dioxane.

The solvents of the present invention may be employed in dewaxing operations for the removal of waxy constituents from petroleum oils. They are suitable for use in dewaxing operations conducted over a wide range of temperature and pressure conditions. However, in general, the dewaxing operation employing the cyclic diethers of the present invention is similar to the conventional dewaxing operation now currently employed. In these operations the solvent is added to the waxy oil and the mixture is heated to assure complete miscibility of all wax and oil fractions with the solvent. The mixture is then chilled to a temperature in the range from about +30° F. to −30° F., the exact temperature chosen depending upon the character of the crystallized wax to be removed and the pour point desired in the dewaxed oil. The crystallized wax is removed either by filtration or by centrifuging, while the solvent is removed from the dewaxed oil fraction by distillation.

The amount of dewaxing solvent employed may vary widely and depends upon the particular oil being dewaxed, the solvent employed, and the characteristics desired in the dewaxed oil. In general, it is preferred to employ from one to four volumes of dewaxing solvent per volume of oil being dewaxed.

Under certain conditions the solvents of the present invention may be employed in conjunction with various other conventional dewaxing solvents, such as ketones, chlorinated solvents, naphtha, olefin oxides, and the like. A particularly effective solvent mixture comprises a cyclic diether and a ketone such as methyl ethyl ketone.

The present invention is not to be limited by any theory or mode of operation, but is to be limited only in and by the following claims in which it is desired to claim all novelty in so far as the prior art permits.

I claim:

1. Process for the removal of waxy constituents from an oil containing the same which comprises mixing with the oil a quantity of a dimethyl dioxane having at least one methyl group attached to the carbon atom in the pour positions, chilling the mixture to a temperature at which the waxy constituents precipitate, separating the precipitated waxy constituents from the dewaxed oil, and removing the solvent therefrom.

2. Process as defined by claim 1 in which said dimethyl dioxane comprises 4,4-dimethyl 1,3-dioxane.

3. Process as defined by claim 1 in which said dimethyl dioxane comprises 4,5-dimethyl meta-dioxane.

4. Process as defined by claim 1 in which said dimethyl dioxane consists of a mixture of 4,4-dimethyl meta-dioxane and 4,5-dimethyl meta-dioxane.

5. Process for the removal of waxy constituents from an oil containing the same which comprises mixing with the oil a solvent consisting of approximately equal quantities of 4,4-dimethyl meta-dioxane and 4,5-dimethyl meta-dioxane, chilling the mixture to a temperature at which the waxy constituents precipitate, separating the precipitated waxy constituents from the dewaxed oil and removing the solvent therefrom by distillation.

6. Process for the removal of waxy constituents from an oil containing the same which comprises mixing with the oil a quantity of 4,4,5-trimethyl meta-dioxane, chilling the mixture to a temperature at which the waxy constituents precipitate, separating the precipitated waxy constituents from the dewaxed oil, and removing the solvent therefrom.

7. In the dewaxing of oils, the improvement comprising the use of an alkylated meta-dioxane as a dewaxing solvent.

8. Process according to claim 7, in which the alkylated portion of the meta-dioxane contains 1 to 4 carbon atoms per alkyl group.

9. Process according to claim 7, in which the dewaxing solvent is a di-alkyl meta-dioxane.

10. Process according to claim 7, in which the dewaxing solvent is a dimethyl meta-dioxane.

11. Process according to claim 7, in which the dewaxing solvent is a 4,4-di-alkyl meta-dioxane.

12. Process according to claim 7, in which the dewaxing solvent is a polymethyl meta-dioxane.

13. Process according to claim 7, in which the dewaxing solvent is a dimethyl meta-dioxane in which both methyl groups are attached to a carbon atom in para position to one of the oxygen atoms.

14. Process according to claim 7, in which the dewaxing solvent is an alkylated meta-dioxane containing at least one methyl group and having at least one methyl group attached to a carbon atom in para position to one of the oxygen atoms.

RAPHAEL ROSEN.

CERTIFICATE OF CORRECTION.

Patent No. 2,335,029.　　　　　　　　　　　　　　November 23, 1943.

RAPHAEL ROSEN.

It is hereby certified that error appears in the printed specification of the above numbered patent requiring correction as follows: Page 2, second column, line 39, claim 1, for "pour" read --four--; and that the said Letters Patent should be read with this correction therein that the same may conform to the record of the case in the Patent Office.

Signed and sealed this 29th day of February, A. D. 1944.

(Seal)

Leslie Frazer

Acting Commissioner of Patents.